United States Patent Office 3,046,193
Patented July 24, 1962

3,046,193
DIPHENYLMETHANE - PIPERAZINE - DICAR-
BOCYANINE: VETERINARY ANTHELMIN-
TIC TREATMENT
Cecil W. Parker, Matthews, N.C., assignor to Allied Animal Research Corporation, Charlotte, N.C., a corporation of North Carolina
No Drawing. Filed Apr. 28, 1959, Ser. No. 809,368
19 Claims. (Cl. 167—53)

This invention relates to new anthelmintic compositions and their administration, and more particularly is directed to anthelmintic compositions useful in the elimination of various types of worms prevalent in the alimentary tracts of canines.

In the practice of veterinary medicine, it is well known that canines are prone to become infected with various types of worms such as roundworms (ascarids), tapeworms (taenia and dipylidium), hookworms (*ancylostoma americana* and *Ancylostoma braziliense*), and to a lesser extent, whipworms (*Trichuris vulpis*). These worms have many deleterious physiological effects on the animal. Some of these effects are, for example, malnutrition, poor hair and teeth, and a generally low condition of health. Unless removed, these worms will eventually cause the ultimate death of the animal.

In the practice of veterinary medicine today, the common practice of treating canines for worms incorporates various steps. The first step in the treatment involves an analysis of the dog's feces to determine the types of worms present in its alimentary tract. Once the types of worms are discovered, one or more anthelmintic compounds are selected from those compounds having the particular properties for killing the specific types of worms due to the fact that prior to this invention, there was no single compound available which would effectively kill all major types of worms which could be administered safely to a canine. After the anthelmintic is selected, the canine must usually undergo a fasting period to remove as much food from the alimentary tract as possible. At the end of the fasting period, the canine is then given the selected anthelmintic in a shock dosage. This shock dosage many times results in gastric upset and, due to the toxicity of the anthelmintic, places a strain on the dog's general health. Subsequent to the anthelmintic dosage, the dog is often given a laxative which most often produces diarrhea. This procedure usually has to be repeated at least two more times within a thirty day period in order to effectively eliminate the worms.

There are also many other problems which arise in the de-worming of canines. For example, caution must be exercised so as not to give the canine an overdose of the toxic anthelmintic; most anthelmintics are extremely distasteful to the dog and thus, must be forced into the dog's system; and, in administering the anthelmintic by force, there is always the danger of being bitten by the dog.

Another problem which arises in the effective elimination of worms is that most often the dog is returned to his normal environment after the anthelmintic treatment. This environment most likely contains the dog's worm-infested feces and, therefore, the dog runs the risk of being re-infested with the worms.

There are also so-called "home remedy" vermicides available on the market today for use by dog owners. However, the same problems, as outlined above for the veterinarian, apply to the home administration of known anthelmintic compounds.

With the above problems in mind, it is the primary object of this invention to provide new anthelmintic compositions particularly useful in deworming canines, which compositions have an anthelmintic action on all of the most prevalent types of gastro-intestinal worms.

Another object of this invention is to provide new anthelmintic compositions particularly useful in deworming canines, which compositions can be administered by the canine owner by admixing such compositions with the canine's food without detracting from the palatability of the food.

A further object of this invention is to provide new veterinary anthelmintic compositions which can be effectively administered in trace dosages to the animal for indefinite periods of time without endangering the animal's general health.

Still another object of this invention is to provide a method of deworming animals such as canines by the administration of a plurality of doses of a combination of anthelmintic compounds, each of said anthelmintic compounds in the dose being in a quantity insufficient to produce an anthelmintic action if administered separately.

There are two essential active ingredients in the anthelmintic compounds of the instant invention. One of these ingredients can be broadly classified as a piperazine compound. Piperazine compounds are well known as having anthelmintic properties. Specific compounds falling within this class include piperazine hydrate, piperazine hydrochloride, piperazine acetate, piperazine propionate, piperazine adipate and piperazine citrate. As an example, it is well known that piperazine citrate is quite effective in the elimination of roundworms (ascarids). In administering piperazine citrate to a dog, the normal practice followed is to administer a dosage of 1.25 gm./25 lbs. of animal weight on three separate occasions after fasting the animal on each occasion. These three dosages are administered within a 24 to 30 day period.

However, it is well known that these piperazine compounds have no accumulative properties, or, in other words, they do not have the property of remaining in the dog's body for an extended period of time, but rather, are passed out in the dog's normal digestive cycle. Thus, each individual dosage of the piperazine compound must be self-sustained, since worm killing properties of subsequent dosages are not enhanced by previous dosages.

The other essential active ingredient of the instant invention can be broadly classified as a diphenylmethane of the type wherein each of the phenyl groups contains at least one halogen substituent and at least one hydroxy substituent. This type of compound is represented by the following formula:

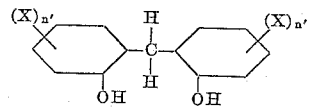

in which X represents a halogen selected from the group consisting of chlorine and bromine and n' represents 1, 2, 3, or 4, and salts of such compounds. Specific compounds falling within this class include 2,2'dihydroxy-5,5'-dichlorodiphenylmethane, 2,2'-dihydroxy-5,5'-dibromodiphenylmethane, 2,2'-dihydroxy - 3,5,3',5' - tetrachlorodiphenylmethane, 2,2' - dihydroxy - 3,5,3',5' - tetrabromo - diphenyl methane 2,2' - dihydroxy - 3,5,6,3',5',6' - hexachlorodiphenyl - methane, 2,2' - dihydroxy - 3,4,5,6,3', 4',5',6' - octachlorodiphenyl - methane, 2,2' - dihydroxy- 5,5' - bromo - 3,6,3',6' - tetrachlorodiphenyl - methane, 2,2' - dihydroxy - 3,5,6,3',5',6' - hexabromodiphenylmethane and their salts including alkali metal, alkaline earth metal, and heavy metal salts.

Among those compounds having more than one hydroxy group on the phenyl rings may be included 2,4,2',4'-tetrahydroxy-5,5'-dichlorodiphenylmethane, 2,4,6,2',4',6'-hexahydroxy-5,5'-dichlorodiphenylmethane, 2,4,2',4'-tetrahydroxy-3,5,3',5'-tetrachlorodiphenylmethane and the corresponding bromo compounds.

Diphenylmethane compounds of the type described are known to have anthelmintic properties. As an example, in the treatment of tapeworms (both taenia and dipylidium) in canines 2,2'-dihydroxy 5,5'-dichlorodiphenylmethane is normally administered on three separate occasions after fasting in a 24 to 30 day period in a dosage of 2.50 gm./25 lbs. animal.

Unlike the piperazine compounds, the diphenylmethanes of the type described have accumulative properties. That is to say, some of the compound is retained in the animal's system for an extended period, and therefore, each subsequent dosage is complemented by the former. The possible effective accumulative dose range for 2,2'-dihydroxy-5,5'-dichlorodiphenylmethane is 22 to 24 mg./lb. of animal weight.

In accordance with the instant invention, I have found that a combination of trace dosages of a piperazine compound such as piperazine citrate, combined with a diphenylmethane of the type described, such as 2,2'-dihydroxy-5,5'-dichlorodiphenylmethane, can be administered in daily doses to a canine for indefinite periods of time without resulting in harmful effects to the canines and with a desired result within a 24 to 30 day period of substantially complete elimination of roundworms, tapeworms (both taenia and dipylidium) and hookworms (*Ancylostoma americana* and *Ancylostoma braziliense*). The anthelmintic compounds in such doses appear in amounts which, if administered individually, would have little or no anthelmintic effect.

Table I is indicative of a comparison of dosage quantities of the two individual anthelmintics mentioned, administered separately, and the two anthelmintics combined together in trace dosages in accordance with the instant invention. This table clearly illustrates the synergistic effect obtainable in the practice of my invention.

TABLE I

| Active ingredient | A Minimum effective dose range when administered alone, mg./lb.[1] | B Minimum effective dose range when administered combined, mg./lb. |
| --- | --- | --- |
| 1. Piperazine citrate | 50 | 15-20 |
| 2. 2,2'-dihydroxy-5,5'-dichlorodiphenylmethane | 22-27 | 10-13 |

[1] Since piperazine citrate does not possess accumulative dosage properties, the dosage appearing in this column represents the recommended single dosage in a three-dose series for effective anthelmintic action.

It should be noted that the proper dose ranges of the individual anthelmintics in Table I are far greater when administered individually (as per column A) than when administered in combination (as per column B). Furthermore, the combination shown in column B has an effective anthelmintic action on both types of hookworms, while neither of these compounds would produce such results if administered individually.

In addition to the results obtainable in accordance with my invention, as explained above, I have found that the addition of a trace of a halide of dithiazanine (3,3' diethylthiadicarbocyanine halide), for example dithiazanine iodide, to the compound containing a diphenylmethane substance of the type described and the piperazine compound with produce the added advantage of elimination of whipworms. For example, referring to the comparison shown in Table I, the minimum effective dose range for dithiazanine iodide when administered alone is from 10 to 15 mg./lb. of animal, while on the other hand, the minimum effective dose range of this compound when administered in accordance with the instant invention is from 1 to 1.5 mg./lb. of animal, or one-tenth of a dosage administered in accordance with the prior art.

Another known problem which arises with the infestation of worms in canines is loss of appetite. This is, of course, detrimental to the over-all health of the canine, especially coupled with deleterious effects of worm infestation.

Furthermore, as previously stated, the actual administration of anthelmintics to canines is troublesome and most often very difficult due to the fact that the canine will not accept the substance voluntarily. Thus, the most common practice is to force the compound into the dog, in the form of a capsule, for example. In the instant invention an obnoxious taste is created by the presence of the diphenylmethanes of the type described. With the above additional problems in mind, I have found that selective addition of certain taste-altering ingredients to the combination of anthelmintics of my invention can be effectuated so as to produce an anthelmintic-containing compound which is highly palatable in the canine and which can be administered as a food additive. In fact, the palatability is so desirable to the canine that the canine will, in many cases, eat food which it would not ordinarily eat in the absence of the compound.

Examples of anthelmintic compositions prepared in accordance with the invention described are shown in Table II.

TABLE II

*Example No. 1*

| | Percent |
| --- | --- |
| 2,2'-dihydroxy-5,5'-dichlorodiphenylmethane | 10 |
| Piperazine citrate | 15 |
| Dextrose | 10 |
| Garlic powder | 5 |
| Oregano | 5 |
| Sucrose | 25 |
| Starch and pulp (of vegetable origin) | 30 |
| Magnesium trisilicate and magnesium stearate | [1] 0.1 |
| | 100 |

*Example No. 2*

| | Percent |
| --- | --- |
| 2,2'-dihydroxy-5,5'-dichlorodiphenylmethane | 10 |
| Piperazine citrate | 15 |
| Dithiazanine iodide (3,3' diethylthiadicarbocyanine iodide) | 1 |
| Dextrose | 10 |
| Garlic powder | 5 |
| Oregano | 5 |
| Sucrose | 25 |
| Starch and pulp (of vegetable origin) | 29 |
| Magnesium trisilicate and magnesium stearate | [1] 0.1 |
| | 100 |

[1] Trace.

The compositions shown in Examples No. 1 and No. 2 of Table II differ primarily in the addition of a dithiazanine halide in Example No. 2. The formula shown in Example No. 2 would be necessary for the elimination of whipworms, as explained earlier. However, it should be pointed out that the usage of the compound in Example No. 2 is not limited to cases of whipworms, but could be used equally as well as the compound in Example No. 1, even in the absence of whipworms.

In ascertaining the outstanding effectiveness of my anthelmintic composition on gastro-intestinal parasites in canines, a series of tests on infected canines were conducted before and after treatment.

In determining the type and degree of worm infestation, the standard flotation test, well known in the practice of veterinary medicine, was employed. This test is carried out by mixing a fecal specimen of the canine with a saturated saline solution and by micro-analysis counting the number of worm ova per gram.

The results of these series of tests are tabulated in Table III.

TABLE III

| Breed | Weight (lbs.) | Age (mos.) | Fecal analysis prior to treatment | No. of days treated with daily dosage (3-4 gm./25 lbs.) of formula of Table II, Ex. #2 [1] | Fecal analysis after 30 days | Fecal analysis after 60-90 days |
|---|---|---|---|---|---|---|
| 1. Dalmatian | 35 | 8 | Dwarf tapeworms, roundworms | 30 | Negative | Negative. |
| 2. Cocker Spaniel | 25 | 36 | Hookworms | 21 | ---do--- | Do. |
| 3. Mixed Terrier | 10 | 5 | Hookworms, roundworms | 24 | ---do--- | Negative.[3] |
| 4. Weimaraner | 7½ | 6½ | Hookworms | 32 | ---do--- | Do.[3] |
| 5. Pekingnese | 10 | 8 | Dwarf tapeworms, roundworms | 30 | ---do--- | Negative. |
| 6. Chow | 14 | 4½ | Roundworms | 30 | ---do--- | Do. |
| 7. German Shepherd | 80 | 12 | Tapeworms, hookworms, whipworms | 30 | Negative [2] | Do. |
| 8. Boston Terrier | 11 | 12 | Hookworms, dwarf tapeworms | 30 | Negative | Do. |
| 9. Miniature French Poodle | 11½ | 12 | Hookworms, roundworms, tapeworms | 25 | ---do--- | No test. |
| 10. Mixed Fox Terrier | 12 | 11 | Dwarf tapeworms, hookworms | 36 | ---do--- | Negative. |
| 11. Mixed Terrier | 5½ | 4 | Hookworms, roundworms | 28 | ---do--- | Do. |

[1] In each case formula was mixed with the dog's food.
[2] A few whipworm ova were found.
[3] A few hookworms were found.

In each of the cases tabulated in Table III, the canine was given 3 to 4 grams/25 lbs. of animal weight of the composition shown in Table II, Example No. 2, by merely adding or mixing the composition with the canine's food. In no case were the canines fasted or given a postvermifuge laxative.

It should be pointed out that the individual dose range of the formulas of Table II need not be limited to 3 to 4 gms./25 lbs., but can vary widely. The only limitations are that the dose contain at least the minimum effective dose amount of each of the anthelmintics in the formula, this being 10-13 mg./lb. of 2,2'-dihydroxy-5,5'-dichlorodiphenylmethane, 15-20 mg./lb. of piperazine citrate, and 1-1.5 mg./lb. of 3,3'-dithiazanine iodide, but contain an insufficient amount of such compounds to produce a toxic effect on the dog.

The excellent results, ease of administration and the synergistic properties of my new anthelmintic compositions can be readily understood by comparing the results shown in Table III with the following case histories which were performed using various known anthelmintics and well-accepted dosing methods:

(1) Eighteen month cocker spaniel showing manifest clinical symptoms of ancylastomiasis (hookworm infestation). Flotation fecal examination revealed 448 count of hookworm ova. After 18-hour fasting, dog was given capsules of preparation containing 2.5 gm. of 2,2'-dihydroxy-5,5'dichlorodiphenylmethane, commonly known as "Di-Phenthane-70" combined with an equal quantity of methylbenzene. This treatment was repeated twice at seven-day intervals. Microscopic examination was repeated 30 days after last dosing and a few hookworm ova (19 count) were noted.

(2) Three year pointer entered for fecal test showing moderate roundworm infestation and heavy (over 400 count) hookworm infestation. Subject was given 4.5 gm. of methylbenzene in capsule form on an empty stomach, followed in 2 hours with 2½ oz. of milk of magnesia. Numerous dead worms of both types were found in feces the next day. Two treatments were repeated at 10-day intervals and a retest 30 days later showed a negative reading.

(3) Mixed-breed dog, eight months, with history of eliminating numerous tapeworm segments in stools during previous 2-month period. Fecal test revealed that the dog also had a moderate ascariasis. One gm. of 2,2'-dihydroxy-5,5'-dichlorodiphenylmethane was administered in tablet form after 18-hour fasting followed by a dose of milk of magnesia on the following day. A retest one week later showed that roundworms were still present, although no evidence of tapeworms was noted. Piperazine citrate was then administered in 1.5 gm. quantities with food once weekly for 3 weeks and a 30-day retest was negative for ascarids. However, 6 weeks later more tapeworm segments were noted in stools and reworming was done successfully using capsules of "Vermiplex" (combination of 2,2'-dihydroxy-5,5'-dichlorodiphenylmethane and methylbenzene).

(4) Welch terrier, fifteen months, with history of taeniasis (tapeworm infestation) which recurred about every 6 to 8 weeks despite numerous wormings with several types of taeniacides. Dog was given 1.5 gm. 2,2'-dihydroxy-5,5'-dichlorodiphenylmethane after 24 hours fasting (with exception of sweet milk). This was repeated 5 times at 21-day intervals and no evidence of worms was noted for 6 months afterwards.

(5) English setter, two years, weight 60 lbs., with marked emaciation and exzema. Fecal test showed heavy hookworm, moderate roundworm, whipworm and tapeworm infestation. Series of three "Vermiplex" (combination of 2,2'-dihydroxy-5,5'-dichlorodiphenylmethane and methylbenzene) treatments were given at 7-day intervals and 20 days later retest was negative except for whipworms which were then successfully treated with "whipcide."

(6) Mixed terrier type, three years, with dematitis and alopecia. Flotation fecal analysis showed moderate hookworm and whipworm infestation. Dog was given 3 gm. "Ributyl" (n butyl chloride) capsules and this was repeated twice at 10-day intervals. A 21-day retest was negative for hookworms but whipworm ova were still present. Two further treatments using "Whipcide" were necessary before finding a negative fecal test. Recovery from the skin trouble was only partial. Skin tone and texture and lustre of hair coat did not appear to be up to normal, 12 weeks later, despite a vitamin-mineral supplement that was added to the food.

(7) Two mixed breed dogs, age 12 months, which lived on the same premises with the above (No. 6) case had normal coats but were examined and found to have heavy hookworm and moderate roundworm infestation. Both were initially given doses of 100 mg./lb. of piperazine citrate and retest 7 days later was negative for roundworms and heavily positive for hookworms. Both of these dogs were then placed on a formulation in accordance with Table II, Example No. 2, above, given daily for a 28-day period. Thirty days after which, a retest proved negative.

(8) A boxer, 3½ years, was given fecal test which showed heavy hookworm and tapeworm infestation. Standard recommended dose of "Vermiplex" (combination of 2,2'-dihydroxy-5,5'-dichlorodiphenylmethane and methylbenzene) was administered after 18-hour fasting. Vomiting of medication occurred within 30 minutes after dosing and animal also failed to retain medicine in a second attempt 2 days later. The third attempt was preceded by gastic sedative (metropine with phenobarbital) and dog did retain the medicine. Two following doses were given at 14-day intervals, also preceded by gastric sedative. Thirty-day retest showed a very few hookworm ova present and no evidence of tapeworms.

The above-cited cases are typically representative of a group of 284 clinical and experimental cases where a diphenylmethane and a piperazine compound of the types forming the two basic anthelmintic compounds used in my invention were used singly or in presently known and commonly used combinations, such as "Vermiplex," originally reported by Blair [1] and the improved form as reported by Burch, Eshenour and Napier.[2]

The contrasts between these standard known anthelmintics and the recommended methods of administration and the anthelmintic compositions of the instant invention and their method of administration are sharp and clearly defined. Firstly, larger quantities of the active agent or agents of the prior art had to be given. Secondly, the administration was in a capsule or tablet form. Thirdly, occasional gastric upsets such as vomiting resulted. Last, these various known agents, singly or in commonly used combinations, do not have the broad range of anthelmintic activity as do the compounds of the instant invention.

In summary, it can readily be seen that the new anthelmintic compositions of the instant invention overcome many of the heretofore necessary steps in administration of known anthelmintic compounds. For example, my compositions are effective against all of the major gastrointestinal worm infestations. Furthermore, my compositions can be administered by the dog owner without fasting the dog, which, of course, requires confinement of the dog and can be administered for indefinite periods of time due to the fact that the trace dosage of toxic anthelmintics appearing in my compositions are so minute that their normal toxicity is negligible. This property of indefinite administration without ill effects is also advantageous in that it permits my compositions to act as a preventative medicine after the initial vermifuging is completed. Furthermore, the use of my compositions obviates the necessity for post-vermifuge laxative dosing, which, of course, eliminates the likelihood of diarrhea.

While my anthelmintic compositions may be administered in any desired form, with or without the palatability increasing ingredients, they are most conveniently administered in powder form with the palatability increasing ingredients mixed therein by adding the compositions to the food of the animal. In this way, the dog is dewormed in a simple manner without the necessity of forcing the medicine into the dog.

In the specification there has been set forth preferred embodiments of the invention and, although specific terms are employed, they are used in a generic and descriptive sense only and not for purposes of limitation, the scope of the invention being defined in the claims.

I claim:

1. A veterinary anthelmintic composition effective against hookworms and other worm infestations comprising a diphenylmethane substance represented by the following formula:

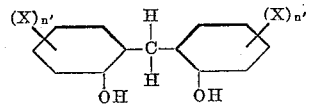

in which X represents a halogen selected from the group consisting of chlorine and bromine and n' is a whole number of from 1 to 4 and wherein one of the halogens on each of the rings is in the 5 position and wherein any additional halogen substituent are arranged symmetrically, and a piperazine compound having anthelmintic properties.

2. A veterinary anthelmintic composition according to claim 1 wherein the diphenylmethane substance is 2,2'-dihydroxy-5,5'-dichlorodiphenylmethane.

3. A veterinary anthelmintic composition according to claim 1 wherein said piperazine compound is piperazine citrate.

4. A veterinary anthelmintic composition effective against hookworms and other worm infestations comprising 2,2'-dihydroxy-5,5'-dichlorodiphenylmethane and piperazine citrate.

5. A veterinary anthelmintic composition according to claim 4 admixed with palatability increasing substances.

6. A veterinary anthelmintic composition according to claim 4 admixed with at least one substance selected from a group consisting of dextrose, sucrose, garlic powder, and oregano.

7. A veterinary anthelmintic composition effective against hookworms and other worm infestations comprising a diphenylmethane substance represented by the following formula:

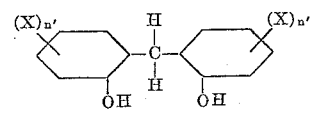

in which X represents a halogen selected from the group consisting of chlorine and bromine and n' is a whole number of from 1 to 4 and wherein one of the halogens on each of the rings is in the 5 position and wherein any additional halogen substituents are arranged symmetrically, a piperazine compound having anthelmintic properties and a 3,3'-diethylthiadicarbocyanine halide.

8. A veterinary anthelmintic composition according to claim 7 admixed with at least one substance selected from the group consisting of dextrose, sucrose, garlic powder, and oregano.

9. A veterinary anthelmintic composition effective against hookworms and other worm infestations comprising 2,2'-dihydroxy-5,5'-dichlorodiphenylmethane, piperazine citrate and 3,3'-diethylthiadicarbocyanine iodide.

10. A veterinary anthelmintic composition according to claim 9 admixed with palatability increasing substances.

11. A veterinary anthelmintic composition according to claim 9 admixed with at least one substance selected from the group consisting of dextrose, sucrose, garlic powder, and oregano.

12. A veterinary anthelmintic composition according to claim 9 admixed with dextrose, sucrose, garlic powder, oregano, starch and pulp of vegetable origin, magnesium trisilicate, and magnesium stearate.

13. A method of treating animals for hookworms and other worm infestations comprising administering an admixture of anthelmintic compounds of a diphenylmethane substance represented by the following formula:

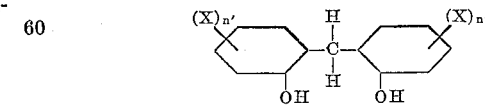

in which X represents a halogen selected from the group consisting of chlorine and bromine and n' is a whole number of from 1 to 4 wherein one of the halogens on each of the rings is in the 5 position and wherein any additional halogen substituents are arranged symmetrically, a piperazine compound having anthelmintic properties, and a 3, 3' diethylthiadicarbocyanine halide, said admixture being administered in a plurality of doses, said anthelmintics being present in each dose in such amounts as to have no effective anthelmintic action if administered separately.

14. A method according to claim 13 including admixing with said anthelmintic compounds, at least one sub-

---

[1] Blair, Harry E., "Vermiplex, A New Anthelmintic for Dogs," North American Veterinarian, vol. 30, May 1949, pp. 306–309.
[2] Burch, Geo. R., Eshenour, R. E., and Napier, R., "Improved Hookworm Treatment With New Vermiplex," The Allied Veterinarian, vol. XXIX, No. 4, July-August 1958, pp. 4–6.

stance selected from the group consisting of dextrose, sucrose, garlic powder and oregano.

15. A veterinary anthelmintic dosage unit effective against hookworms and other worm infestations comprising an admixture of anthelmintic compounds of a diphenylmethane substance represented by the following formula:

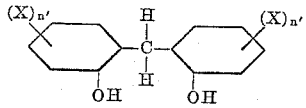

in which X represents a halogen selected from the group consisting of chlorine and bromine and $n'$ is a whole number of from 1 to 4 and wherein one of the halogens on each of the rings is in the 5 position and wherein any additional halogen substituents are arranged symmetrically, a piperazine compound having anthelmintic properties and a 3, 3′ diethylthiadicarbocyanine halide, each of said anthelmintic compounds being present in said dosage unit in amounts which would have no effective anthelmintic action if administered separately.

16. A veterinary anthelmintic dosage unit according to claim 15 admixed with at least one substance selected from the group consisting of dextrose, sucrose, garlic powder, and oregano.

17. A veterinary anthelmintic dosage unit according to claim 15 admixed with dextrose, sucrose, garlic powder, oregano, starch and pulp of vegetable origin, magnesium trisilicate, and magnesium stearate.

18. A veterinary anthelmintic composition effective against hookworms and other worm infestations, the active component of which consists of a synergistic mixture of 2, 2′-dihydroxy-5,5′-dichlorodiphenylmethane, in an amount of a minimum of about 10 mg./lb. of animal and a maximum of less than 22 mg./lb. of animal, piperazine citrate in an amount of a minimum of about 15 mg./lb. of animal and a maximum of less than 50 mg./lb. of animal and 3,3′-diethylthiadicarbocyanine iodide in an amount of a minimum of about 1 mg./lb. of animal to a maximum of less than 10 mg./lb. of animal.

19. A veterinary anthelmnitic composition effective against hookworms and other worm infestations, the active component of which consists of a synergistic mixture of 2,2′ - dihydroxy - 5,5′ - dichlorodiphenylmethane, in an amount of a minimum of about 10 mg./lb. of animal and a maximum of less than 22 mg./lb. of animal, piperazine citrate in an amount of a minimum of about 15 mg./lbs. of animal and a maximum of less than 50 mg./lb. of animal and 3,3′-diethylthiadicarbocyanine iodide in an amount of a minimum of about 1 mg./lb. of animal to a maximum of less than 10 mg./lb. of animal, the remainder of the composition consisting of palatability increasing ingredients.

References Cited in the file of this patent
UNITED STATES PATENTS

| | | |
|---|---|---|
| 2,646,383 | Craig | July 21, 1953 |
| 2,814,583 | Leiper | Nov. 26, 1957 |
| 2,893,914 | McCowen | July 7, 1959 |

OTHER REFERENCES

Watkins: J. Pharmacy and Pharmacol, vol. 10, No. 4, April 1958, pp. 209, 220, 221, 222 and 223.

Helminthological Abstracts, Commonwealth Bureau of Helminthology, Farnham Royal, Bucks., England, vol. 25, part 1, 1956, p. 6.